United States Patent
Hartmann et al.

(10) Patent No.: US 7,907,794 B2
(45) Date of Patent: Mar. 15, 2011

(54) METHOD FOR ALIGNING A MODIFIED DOCUMENT AND AN ORIGINAL DOCUMENT FOR COMPARISON AND DIFFERENCE HIGHLIGHTING

(75) Inventors: Brian Hartmann, Simi Valley, CA (US); Benjamin Gunderson, Simi Valley, CA (US)

(73) Assignee: Bluebeam Software, Inc., Pasadena, CA (US)

( * ) Notice: Subject to any disclaimer, the term of this patent is extended or adjusted under 35 U.S.C. 154(b) by 1086 days.

(21) Appl. No.: 11/626,709

(22) Filed: Jan. 24, 2007

(65) Prior Publication Data
US 2008/0175515 A1     Jul. 24, 2008

(51) Int. Cl.
*G06K 9/36*     (2006.01)
(52) U.S. Cl. .......................................... 382/289; 382/282
(58) Field of Classification Search .................. 382/289, 382/282
See application file for complete search history.

(56) References Cited

U.S. PATENT DOCUMENTS

| | | | |
|---|---|---|---|
| 4,985,930 A * | 1/1991 | Takeda et al. .................. | 382/306 |
| 5,150,434 A * | 9/1992 | Hori et al. ...................... | 382/282 |
| 5,611,033 A | 3/1997 | Pitteloud et al. | |
| 6,081,611 A * | 6/2000 | Linford et al. ................. | 382/128 |
| 6,249,360 B1 | 6/2001 | Pollard et al. | |
| 2003/0126566 A1* | 7/2003 | Saito ................................. | 716/4 |
| 2003/0160785 A1* | 8/2003 | Baumberg ..................... | 345/419 |
| 2004/0085354 A1 | 5/2004 | Massand | |
| 2004/0139391 A1 | 7/2004 | Stumbo et al. | |
| 2004/0148145 A1* | 7/2004 | Chen et al. ........................ | 703/2 |
| 2004/0186817 A1 | 9/2004 | Thames et al. | |
| 2006/0103649 A1 | 5/2006 | Whatmough | |
| 2008/0152225 A1* | 6/2008 | Iwamoto ........................ | 382/190 |

* cited by examiner

*Primary Examiner* — Wenpeng Chen
(74) *Attorney, Agent, or Firm* — Stetina Brunda Garred & Brucker

(57) ABSTRACT

A method for aligning a modified document and an original document is provided according to an aspect of the present invention. The method includes a step of receiving a first bitmap representative of the modified document, including a first anchor. Additionally, a second bitmap representative of the original document including a second anchor is received. The method also includes the step of deriving a set of first vertex coordinates of the first anchor, and a set of second vertex coordinates of the second anchor. The method further includes the step of transforming the first bitmap to a common reference based upon the first set of vertex coordinates, and the step of transforming the second bitmap to the common reference based upon the second set of vertex coordinates.

12 Claims, 6 Drawing Sheets

METHOD FOR ALIGNING A MODIFIED DOCUMENT AND AN ORIGINAL DOCUMENT FOR COMPARISON AND DIFFERENCE HIGHLIGHTING

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present invention relates generally to methods for electronic document revision tracking and control. More particularly, the present invention relates to a method for calibrating a modified document and an original document for difference identification.

2. Related Art

Advancements in high speed data communications and computing capabilities have increased the use of remote collaboration for conducting business. While real-time collaboration using videoconferencing and the like are gaining popularity, the vast majority of collaboration occurs over e-mail in the exchange documents incorporating incremental modifications, comments, and the like. A local user may create an initial version of a document, and transmit the same to remotely located colleagues. These remote users may then make their own changes or add comments in the form of annotations appended to the document, and then transmit the new version back to the local user.

Such collaboration may involve the exchange of documents generated with word processing applications, desktop publishing applications, illustration/graphical image manipulation applications, Computer Aided Design (CAD) applications, and so forth. As utilized herein, the term "document" may refer to data produced by any of the aforementioned software applications. Furthermore, the term "content" may refer to data particular to the software application that generated it and stored in the document of the same. Due to the existence of many different computing platforms having a wide variety of operating systems, application programs, and processing and graphic display capabilities, however, it has been recognized by those in the art that a device-independent, resolution-independent file format was necessary to facilitate such exchange. In response to this need, the Portable Document Format (PDF), amongst other competing formats, has been developed.

The PDF standard is a combination of a number of technologies, including a simplified PostScript interpreter subsystem, a font embedding subsystem, and a storage subsystem. As those in the art will recognize, PostScript is a page description language for generating the layout and the graphics of a document. Further, per the requirements of the PDF storage subsystem, all elements of the document, including text, vector graphics, and raster (bitmap) graphics, collectively referred to herein as graphic elements, are encapsulated into a single file. The graphic elements are not encoded to a specific operating system, software application, or hardware, but are designed to be rendered in the same manner regardless of the specificities relating to the system writing or reading such data. The cross-platform capability of PDF aided in its widespread adoption, and is now a de facto document exchange standard. Currently, PDF is utilized to encode a wide variety of document types, including those composed largely of text, and those composed largely of vector and raster graphics. Due to its versatility and universality, files in the PDF format are often preferred over more particularized file formats of specific applications. As such, documents are frequently converted to the PDF format.

The exchange of documents according to the workflow described above may take place numerous times, with the content of the document evolving over time. For example, in various engineering projects utilizing CAD drawings such as in architecture or product design, a first revision of the document may include only a basic outline or schematic. Subsequent revisions may be generated for review and approval as further features or details are added prior to construction or production. On a more extended timeline, multiple iterations of designs may be produced. In another example, an author or a graphics designer may produce an initial draft of a document, with editors and reviewers adding comments or otherwise marking the document and resubmitting it to the author or graphics designer. The changes are incorporated into a subsequent version. While in some instances the review and approval process is performed directly on the electronic document, there are many instances where a printed hard copy of the document is utilized. As such, the reviewer may annotate, comment upon, edit, or otherwise supplement with information directly upon the hard copy of the document.

When it is necessary to send the printed copy of the document to another electronically, a scanner is typically utilized to capture the document. More particularly, the scanner converts an "analog" image, which consists of continuous features such as lines and areas of color, to a digitized encoding that represents the analog image. A rasterized image, or a bitmap, is generated comprising rows and columns of pixels, with each pixel representing one point in the image. Separately viewed, the pixel does not convey useful visual information, but when the entire field of pixels is viewed at an appropriate distance, a facsimile of the analog image can be recognized. As is generally known, each pixel is represented by luminance strengths of primary colors. Digital representation typically uses the RGB (Red Green Blue) color space, while print typically uses the CMYK (Cyan, Magenta, Yellow, Black) color space.

In acquiring the digital image, some distortion with respect to scale and rotation may be introduced. A correction filter may be applied to the data, though this can correct distortions only to a certain degree. Additionally, correction filters may also attempt to correct distortions introduced during the analog-to-digital conversion process. Due to the existence of numerous other variables that affect the capture and conversion of images, acquiring an exact digital replica of the printed copy is difficult.

During collaboration, it is often desirable to review earlier versions of a document and comparing the same to a current version of the document. By doing so, the evolution of the content may be better appreciated, and each change made to the content may be tracked for approval and other purposes. Various techniques exist for emphasizing differences, but each such technique requires that the two documents being compared be properly aligned. Otherwise, unchanged portions of the document may be identified as being different, when it is only pixel noise, rotation, scale, offset or other like distortion that is different. Where one version of the document is generated directly from the application and another version of the document is scanned from a printed copy, either or both of the documents may be distorted.

Accordingly, there is a need in the art for a method for aligning a modified document and an original document where such documents are being compared to accentuate differences therebetween. There is a need for automatically aligning the documents and minimizing the distortions of the documents so that a comparison tool does not generate false positives.

BRIEF SUMMARY

According to an aspect of the present invention, there is a method for aligning a modified document and an original document for emphasizing differences. The method may include a step of receiving a first bitmap representative of the modified document. The modified document may include a first anchor. Furthermore, a second bitmap representative of the original document may be received, in which the original document includes a second anchor. The method may also include the step of deriving a set of first vertex coordinates of the first anchor, and a set of second vertex coordinates of the second anchor. More broadly, common bounding points of the modified document and the original document are identified. The method may then include the step of transforming the first bitmap to a common reference based upon the first set of vertex coordinates, and transforming the second bitmap to the common reference based upon the second set of vertex coordinates. It will be understood that common reference is a rectangle with sides parallel to the edge of each of the first and second bitmaps. Generally, the foregoing method refers to the process of aligning the modified document and the original document such that the aforementioned common bounding points are proximal with respect to each other.

In accordance with another aspect of the present invention, the first and second bitmaps are each defined by a plurality of pixels arranged in ordered rows and columns. Each of the pixels may have pixel coordinates associated therewith. Additionally, the first and second bitmaps define a left side and a right side, between which the ordered columns of the pixels extend.

In yet another aspect, the deriving of the set of first vertex coordinates further includes the step of storing in a first comprehensive coordinates list the pixel coordinates of a leftmost pixel matching a trigger value, as well as a rightmost pixel matching the trigger value. According to another embodiment of the present invention, the trigger value may be a non-white pixel value. The pixel coordinates of every row in the first bitmap may be so stored. The method may continue with storing in a sample coordinates list a subset of the pixel coordinates in the first comprehensive coordinates list. Additionally, the method may include the step of assigning average pixel coordinates of the sample coordinates list may satisfy a predefined condition. In another aspect, the attribute may include the average pixel coordinates of the sample coordinates list and a standard deviation of the pixel coordinates in the sample coordinates list. Further, the predefined condition may be that the average pixel coordinates of the sample coordinates list is within two standard deviations of the pixel coordinates in the first comprehensive coordinates list. Alternatively, the predefined condition may be that the standard deviation of pixel coordinates in the sample coordinates list is sufficiently small. According to one embodiment of the present invention the sample coordinates list includes at least twenty pixel coordinates.

According to another aspect of the present invention, the first and second anchors are rectangular borders. Along these lines, such rectangular borders are defined by an upper left corner, and upper right corner, a lower left corner, and a lower right corner, with each corner referenced by a one of the vertex coordinates.

In still another aspect of the present invention, the step of transforming the first bitmap includes applying a first inverse transform matrix function to the first bitmap. A first parameter therefor may be derived from the first set of vertex coordinates. Moreover, the step of transforming the second bitmap includes applying a second inverse transform matrix function to the second bitmap. A second parameter therefor may be derived from the second set of vertex coordinates. In further detail, the first and second inverse transform functions may be a rotation function. The first parameter may be a first offset angle between a first line segment defined by the first set of vertex coordinates and a first vertical edge of the first bitmap. The second parameter may be a second offset angle between a second line segment defined by the second set of vertex coordinates and a second vertical edge of the second bitmap.

According to one aspect of the present invention, the method may include a step of storing in a memory the first parameter and the second parameter for further processing.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

Common reference numerals are used throughout the drawings and the detailed description to indicate the same elements.

DETAILED DESCRIPTION

The detailed description set forth below in connection with the appended drawings is intended as a description of the presently preferred embodiment of the invention, and is not intended to represent the only form in which the present invention may be constructed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first and second, and the like are used solely to distinguish one from another entity without necessarily requiring or implying any actual such relationship or order between such entities.

Figure 1:
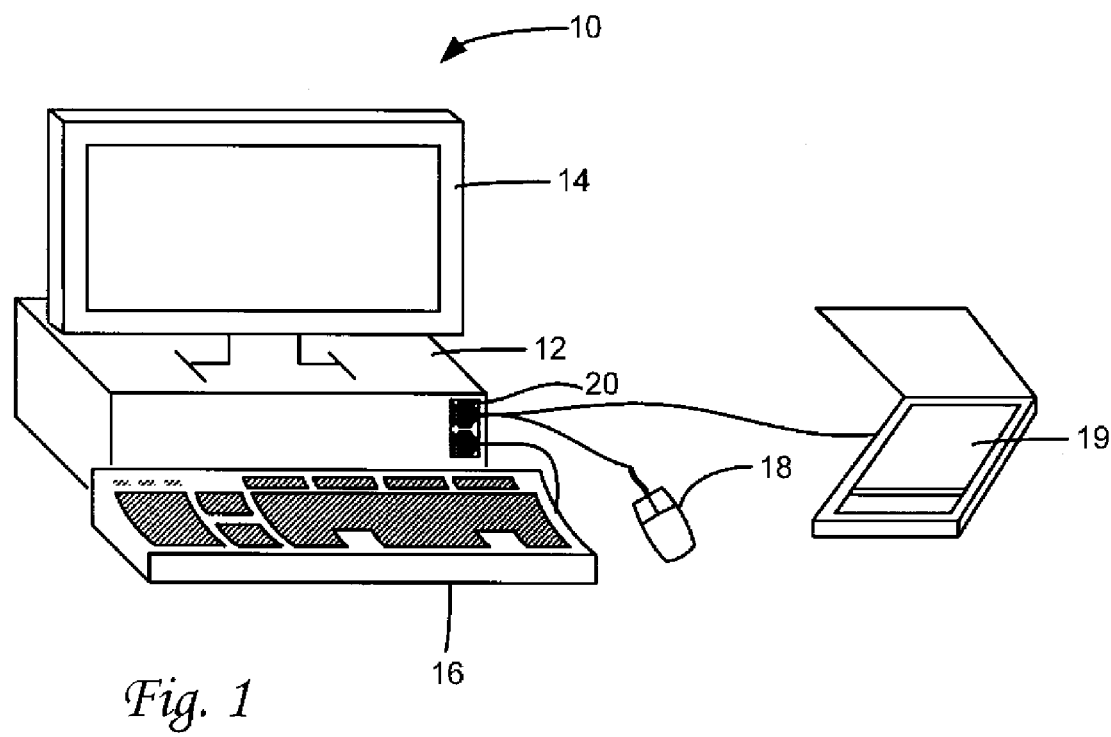
FIG. 1 is a perspective view of a computer system that may be used to implement aspects of the present invention, including a system unit, a display unit, a scanner, and various other input devices.

With reference to FIG. 1, an exemplary hardware environment in which aspects of the present invention may be implemented includes a computer system 10 with a system unit 12 and a display unit 14. The display unit 14 graphically displays output from the data processing operations performed by the system unit 12, and may be of a Liquid Crystal Display (LCD) type, a Cathode Ray Tube (CRT) type, or any other suitable type of display. Devices such as a keyboard 16 and a mouse 18 provide input to the data processing operations, and are connected to the system unit 10 via a USB port 20. In addition, a scanner 19 may be included in the computer system 10. As was explained above, the scanner 19 converts an analog image to a digitized form that represents the analog image, and transmits the generated bitmap to the system unit 12 for further processing. Various other input and output devices may be connected to the system unit 12, and alternative interconnection modalities may be substituted with the USB port 20.

Figure 2:
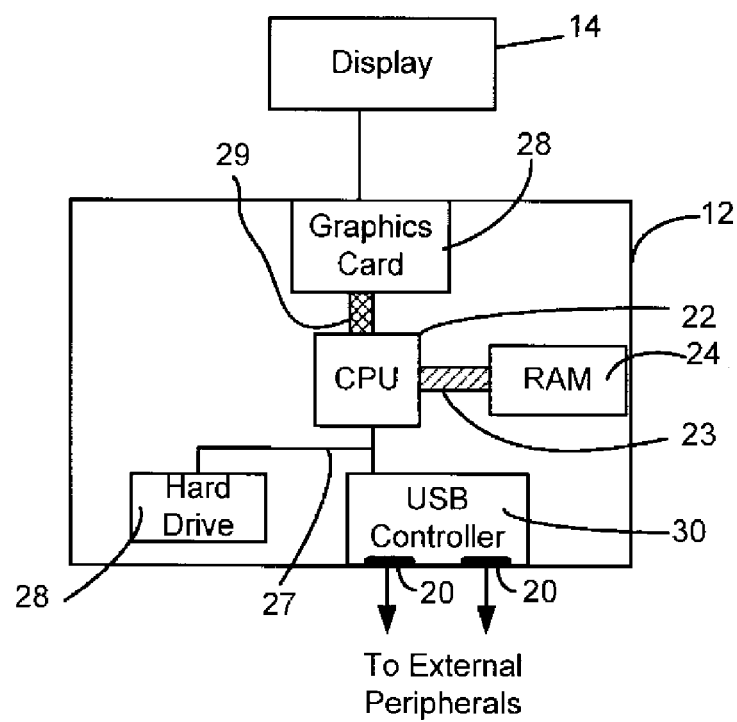
FIG. 2 is a block diagram of the components of the system unit in the computer system illustrated in FIG. 1.

As shown in the block diagram of FIG. 2, the system unit 12 includes a Central Processing Unit (CPU) 22, which may represent one or more conventional types of such processors, such as an IBM PowerPC, Intel Pentium (x86) processors, and so forth. A Random Access Memory (RAM) 24 temporarily stores results of the data processing operations performed by the CPU 22, and is interconnected thereto typically via a dedicated memory channel 23. The system unit 10 may also include permanent storage devices such as a hard drive 26, which are also in communication with the CPU 22 over an i/o bus 27. Other types of storage devices such as tape drives, Compact Disc drives, and the like may also be connected. A graphics card 28 is also connected to the CPU 22 via a video bus 29, and transmits signals representative of display data to the display unit 14. As indicated above, the keyboard 16, the mouse 18, and the scanner 19 are connected to the system unit 12 over the USB port 20. A USB controller 30 translates data and instructions to and from the CPU 22 for external peripherals connected to the USB port 20. Additional devices such as printers, microphones, speakers, and the like may be connected to the system unit 12.

The system unit 12 may utilize any operating system having a graphical user interface (GUI), such as WINDOWS from Microsoft Corporation of Redmond, Wash., MACOS from Apple, Inc. of Cupertino, Calif., various versions of UNIX with the X-Windows windowing system, and so forth. The system unit 12 executes one or more computer programs, with the results thereof being displayed on the display unit 14. Generally, the operating system and the computer programs are tangibly embodied in a computer-readable medium, e.g. one or more of the fixed and/or removable data storage devices including the hard drive 26. Both the operating system and the computer programs may be loaded from the aforementioned data storage devices into the RAM 24 for execution by the CPU 22. The computer programs comprise instructions which, when read and executed by the CPU 22, cause the same to perform the steps necessary to execute the steps or features of the present invention.

The foregoing computer system 10 represents only one exemplary apparatus suitable for implementing aspects of the present invention. As such, the computer system 10 may have many different configurations and architectures. Any such configuration or architecture may be readily substituted without departing from the scope of the present invention.

Figure 4:
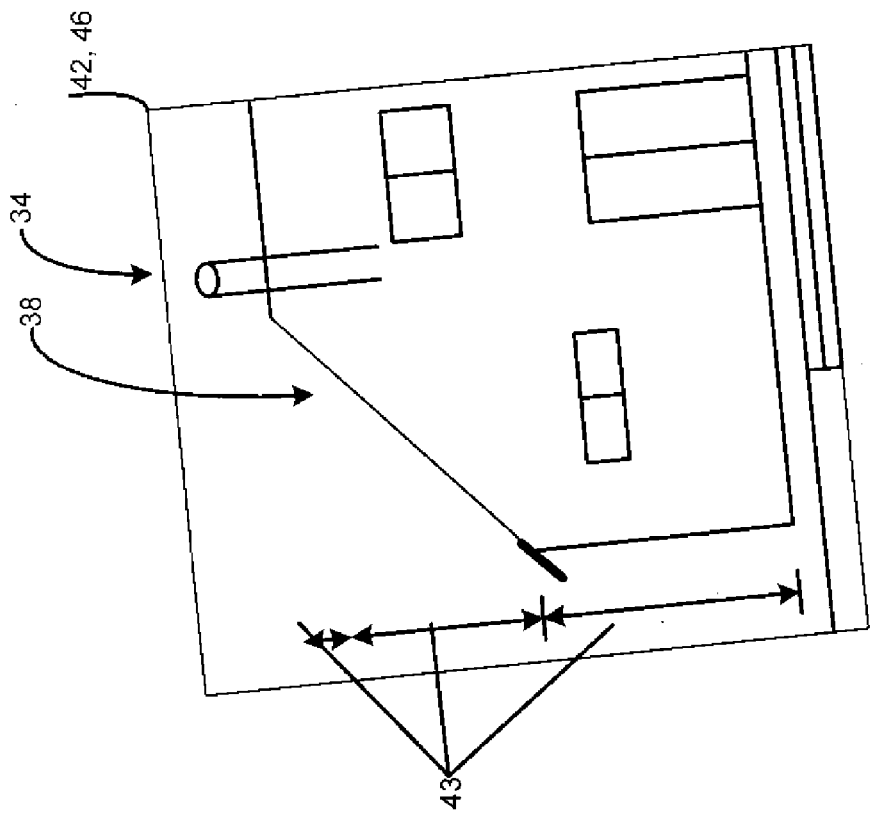
FIG. 4 is an example of an original document shown rotating slightly to the left, including various graphic elements rotated slightly to the right.
Figure 3:
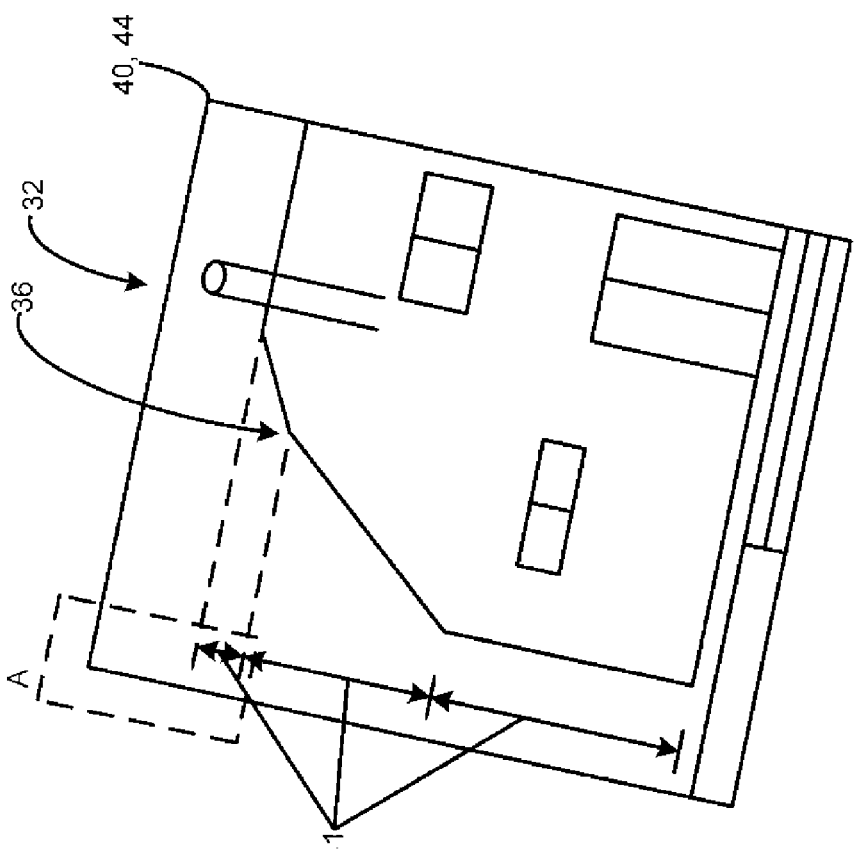
FIG. 3 is an example of a modified document shown rotated slightly to the right, with certain graphic elements being modified in relation to an original document.

With reference to FIGS. 3 and 4, an aspect of the present invention relates to a method for aligning a modified document 32 and an original document 34 for emphasizing differences therebetween. It will be appreciated that the particular contents of the modified document 32 and the original document 34, which are architectural drawings of a house, are presented by way of example only and not of limitation. In further detail, a roof portion 36 of the modified document 32 differs from a roof portion 38 of the original document 34. Both the modified document 32 and the original document 34 includes borders 40, 42, respectively, as well as various dimensioning elements 41, 43. Additionally, the modified document 32 is rotated slightly to the right, while the original document 34 is rotated slightly to the left.

Figure 5:
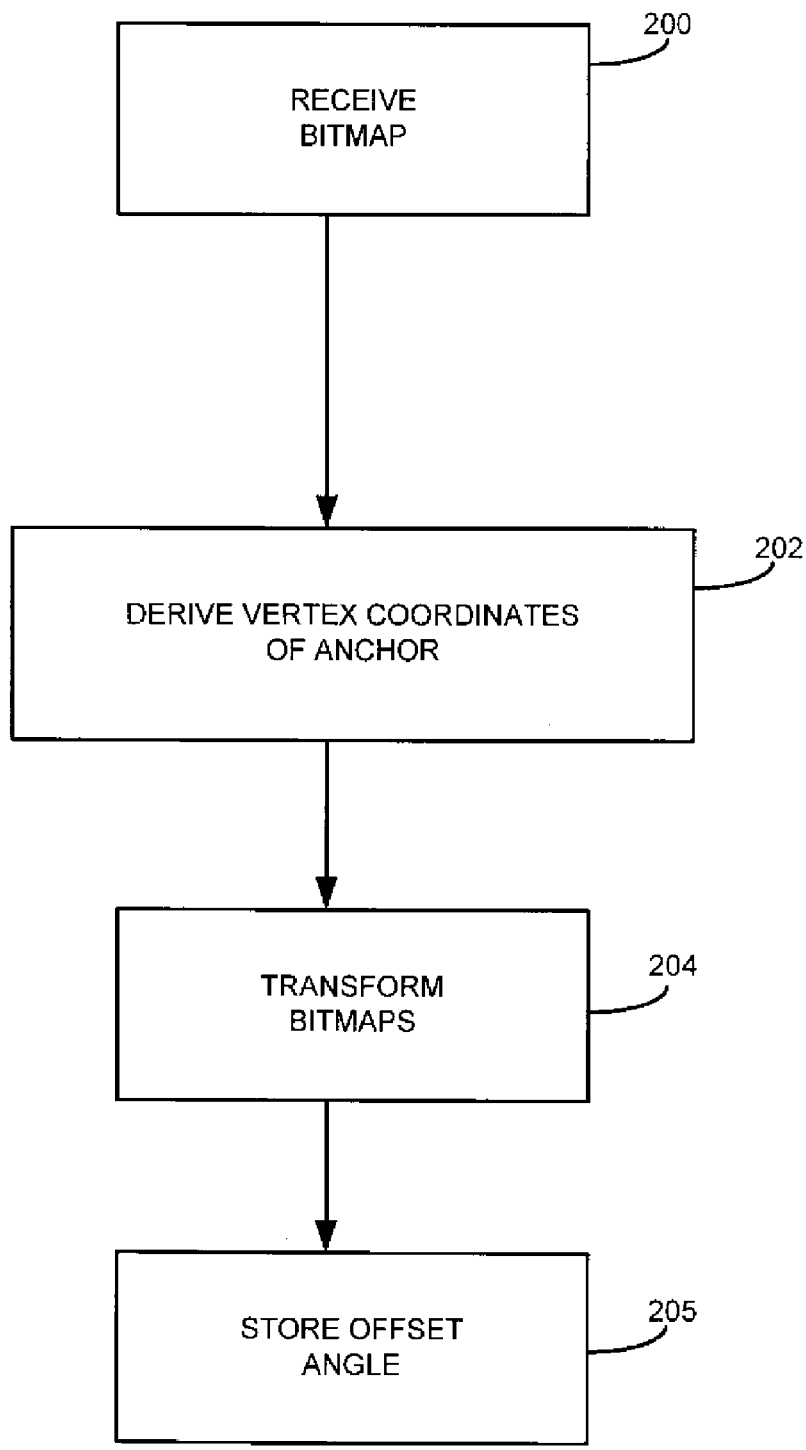
FIG. 5 is a flowchart describing a method for aligning a modified document and an original document.

With reference to the flowchart of FIG. 5, the method for aligning documents in accordance with an aspect of the present invention includes a step 200 of receiving a first bitmap representative of the modified document 32, and a second bitmap representative of the original document 34. The modified document 32 and the original document 34 are each understood to include a first anchor 44 and a second anchor 46, respectively. As illustrated in FIGS. 3 and 4, the anchor 44 of the modified document 32 is embodied as the border 40, and the anchor 46 of the original document 34 is embodied as the border 42. It is understood that any other type of anchors besides the borders 40, 42 may be readily substituted without departing from the scope of the present invention, and may include any element within the modified document 32 and the original document 34 that are common between each other. Further details relating to the processing of the anchors 44, 46 will be described below.

According to one embodiment, the modified document 32 and the original document 34 are PDF files, with its contents being stored as discrete objects of text, geometric primitives, or blocks of raster images. If the modified document 32 was digitized from a hard copy, while the entire image is likely to be a raster image, the image itself will be encapsulated as an object within the PDF file. According to such an embodiment, the modified document 32 is converted to the first bitmap, and the original document 34 is converted to the second bitmap. However, it is understood that the modified document 32 and the original document 34 may already exist as bitmaps. In such a case, the conversion is omitted.

Hereinafter, reference will be made to certain attributes of the modified document 32 and processes performed thereon. It will be appreciated that the same attributes are known to be applicable to the original document 34, and the same processes are known to be performed on the original document 34. Unless otherwise applicable, the following description will not make reference to identical attributes and processes relating to the original document 34 for the sake of simplicity.

Figure 6:
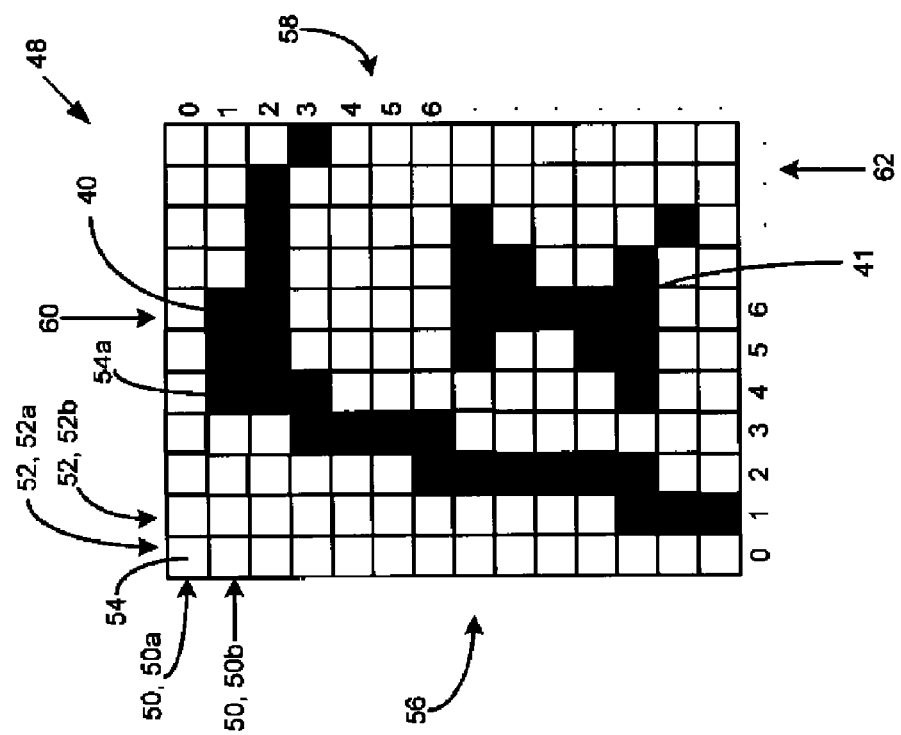
FIG. 6 is an exemplary bitmap of a magnified area A of the modified document showing portions of a border or anchor thereof.

A magnified area A of FIG. 3 is shown in FIG. 6 after the modified document 32 has been converted to a bitmap 48. It will be recognized that though FIG. 6 shows only a portion of the modified document 32 as the bitmap 48, the entirety of the modified document 32 is understood to be converted in accordance with an aspect of the present invention. The bitmap 48 is comprised of multiple rows 50 and columns 52 of pixels 54, with the columns 52 being arranged from a left side 56 to a right side 58, and the rows 50 being arranged from a top 60 to a bottom 62. Each of the pixels 54 are referenced by a set of coordinates that identify a particular one of the rows 50 and one of the columns 52. By way of example only and not of limitation, the bitmap 48 may have a coordinate system in which each of the pixels 54 in a top row 50a has a Y-axis coordinate of 0, each of the pixels 54 in a row 50b immediately below has a Y-axis coordinate of 1, and so forth. Additionally, according to such a coordinate system, each of the pixels 54 in a leftmost column 52a has an X-axis coordinate of 0, each of the pixels 54 in a column 52b immediately to the right thereof has an X-axis coordinate of 1, and so forth. Thus, an exemplary pixel 54a that represents a part of the border 40 has a coordinate of (6,1). It will be appreciated by those having ordinary skill in the art that other coordinate systems may be utilized, and any such alternative may be readily substituted without departing from the scope of the present invention.

As shown in FIG. 6, active ones of the pixels 54 define the border 40, as well as the dimensioning element 41. It is understood that each of the pixels 54 represents a point in an image, and has associated therewith a set of three luminance values. A first value represents the intensity of the red color, a second luminance value represents the intensity of the green color, and a third luminance value represents the intensity of the blue color. The intensity is represented as a numerical value, typically between 0 and 255 for an 8-bit color depth. By combining varying intensities of the red, green, and blue components, any color may be reproduced. It will also be appreciated that the number of pixels 54 per a given unit of measure defines the resolution of the bitmap 44.

Figure 7:
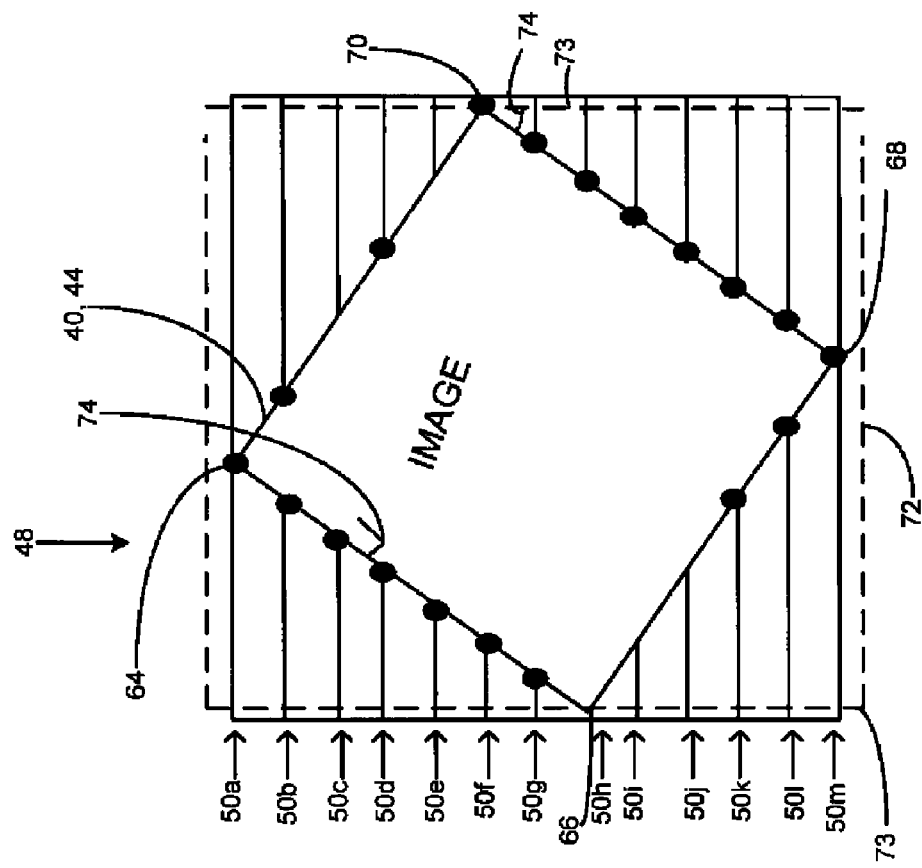
FIG. 7 is a simplified version of an exemplary bitmap showing the coordinates of a leftmost and a rightmost pixel of each row being retrieved in accordance with an aspect of the present invention.
Figure 8:
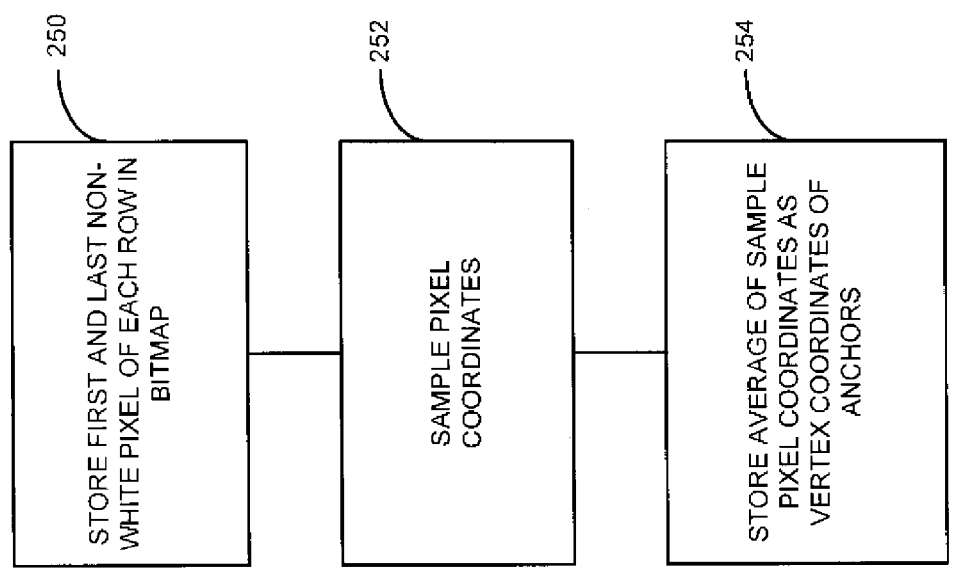
FIG. 8 is a flowchart further detailing a step of deriving a set of vertex coordinates.

Referring again to the flowchart of FIG. 5, the method for aligning a modified document 32 and an original document 34 includes a step 202 of deriving a set of vertex coordinates of the anchor 44. As described briefly above, the anchor 44 may be a border, a corner element, or the like that provides a reference frame. With reference to FIG. 7 that shows a simplified version of the bitmap 48, the anchor 44 is generally defined by a first vertex 64 located on the upper left corner, a second vertex 66 located on the lower left corner, a third vertex 68 located on the lower right corner, and a fourth vertex 70 located on the upper right corner. The coordinates of the foregoing first, second, third, and fourth vertices 64, 66, 68, and 70 are derived in the step 202. In further detail as shown in the flowchart of FIG. 8, this process involves a step 250 of storing the coordinates of the leftmost non-white pixel and the rightmost non-white pixel for each of the rows 50a-m of the bitmap 48. As a preparatory measure for the step 205, the edges of the bitmap 48 may be overwritten with white pixels to define a margin. In one embodiment of the present invention, the depth of such a margin may be predetermined or selected by a user.

By way of an example shown in FIG. 6, in the first row 50a, there are no coordinates recorded, but in the second row 50b, the leftmost non-white pixel is at (4,1) and the rightmost non-white pixel is at (6,1). The coordinates associated with the leftmost non-white pixels are stored in a first list, and the coordinates associated with the rightmost non-white pixels are stored in a second list. For each of the first and second lists, an average and a standard deviation of the X coordinate values are recorded.

The derivation of the set of vertex coordinates continues with a step 252 of sampling the pixel coordinates from the first list and the second list, and calculating an average and a standard deviation of the X coordinate values. The sample is taken starting from the top, that is, the beginning, as well as the bottom, that is, the end, of the first and second lists. As indicated above, the first list is associated with the leftmost non-white pixels, which include the pixels between the first vertex 64 and the second vertex 66 along a line defined between these two points, while the second list is associated with the rightmost non-white pixels, which include the pixels between the third vertex 68 and the fourth vertex 70 along a line defined between these two points. Accordingly, it is understood that the samples from the top the beginning) of the first list reference points proximal to the first vertex 64, while the samples from the bottom (the end) of the first list reference points proximal to the second vertex 66. Furthermore, the samples from the bottom of the second list reference points proximal to the third vertex 68, and the samples from the top of the second list reference points proximal to the fourth vertex 70. According to one embodiment of the present invention, each sampling retrieves at least twenty coordinates from the first and second lists.

The derivation of the set of vertex coordinates concludes with a step 254 of storing the average value of the sampled pixel coordinates as a one of the set of vertex coordinates. Before doing so, the suitability of such coordinates to represent one of the first, second third, and fourth vertices 64, 66, 68, and 70 are determined. This involves determining whether the standard deviation of the sampled pixel coordinates is sufficiently small enough, and whether the average of the sampled pixel coordinates is close enough to the average of the respective one of the first or second lists. More particularly with respect to this second aspect of the assessment, the average of the sampled pixel coordinates is deemed to be close enough to the average of the first or second list where the difference is less than two standard deviations of the first or second list. For example, in determining the coordinates for the second vertex 66, a first sampling that may include rows 50m, 50l, and 50k will have a high standard deviation. Furthermore, the average values of the first sampling will be substantially higher than the average of all of the rows 50a-l.

Where, as in the example, the sampled pixel coordinates do not pass the aforementioned assessments, the process repeats after incrementing the start point. Continuing with the above example, the rows 50l-50j are sampled. The process continues until a suitable sample is retrieved. It is understood that the foregoing process reduces the possibility of mistakenly selecting a noise or other pixel as one of the vertex coordinates.

With reference to FIG. 5, the method for aligning documents includes a step 204 of transforming the bitmap 48 to a common reference 72. The common reference 72 is understood to be a rectangle with sides 73 parallel to the left and right sides 56, 58 of the bitmap 48, and is based upon the minimum and maximum values of the vertex coordinates. As will be appreciated, by determining the coordinates of the first vertex 64, the second vertex 66, the third vertex 68, and the fourth vertex 70 associated with the anchor 44 as set forth above, an offset angle 74 between the anchor 44 and the common reference 72 may be determined.

Figure 9:
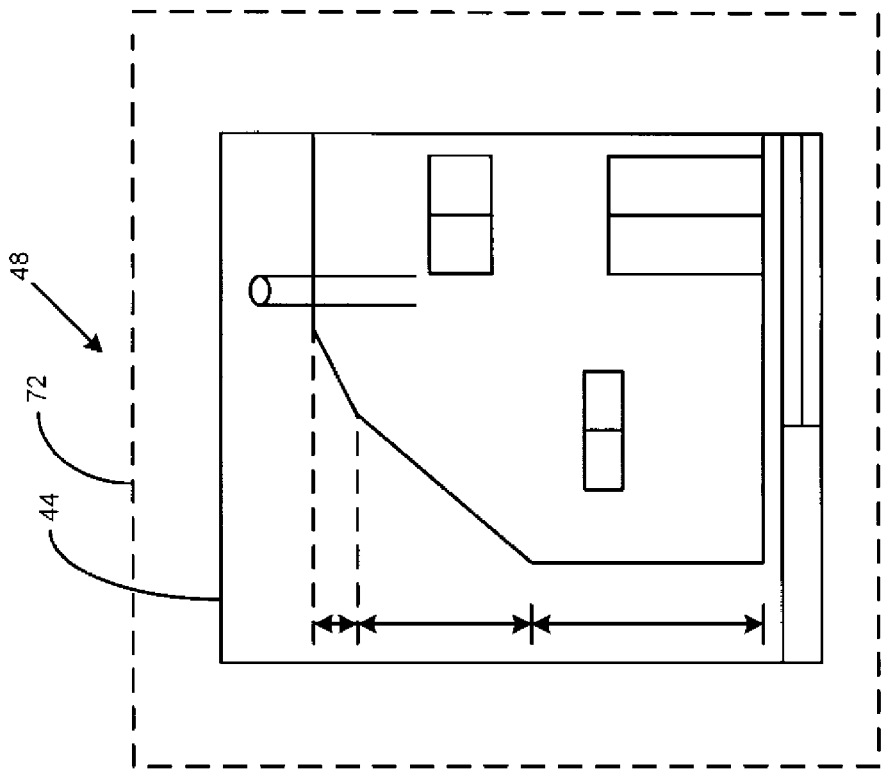
FIG. 9 is the modified document after applying a transform matrix function and being properly aligned with a common reference.
Figure 10:
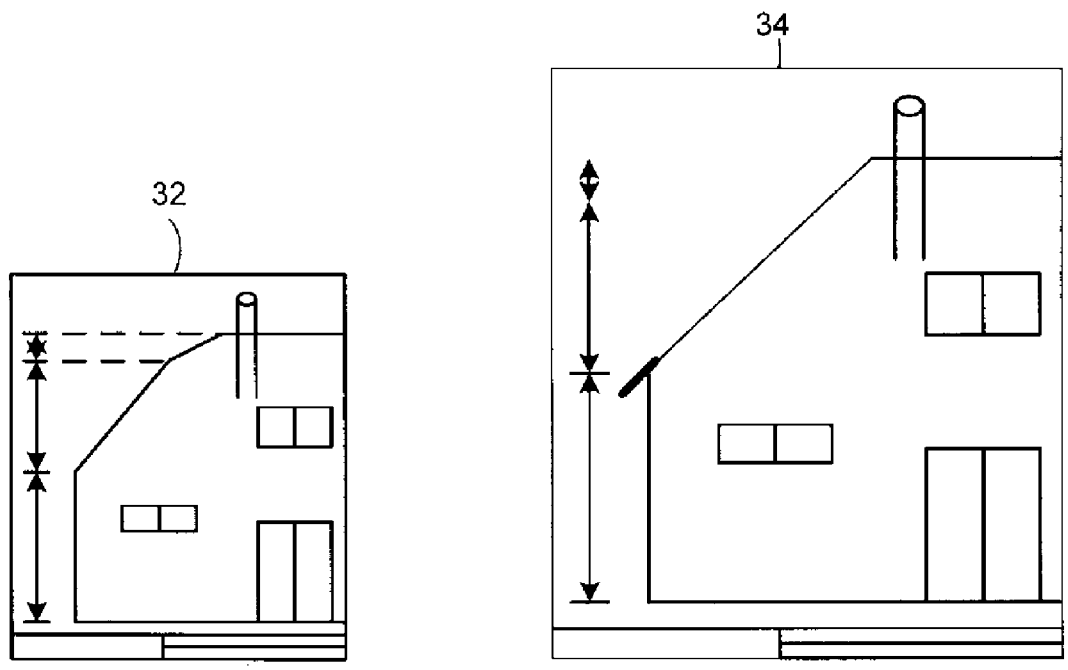
FIG. 10 shows the modified document and the original document, where the modified document is significantly smaller than the original document.
Figure 11:
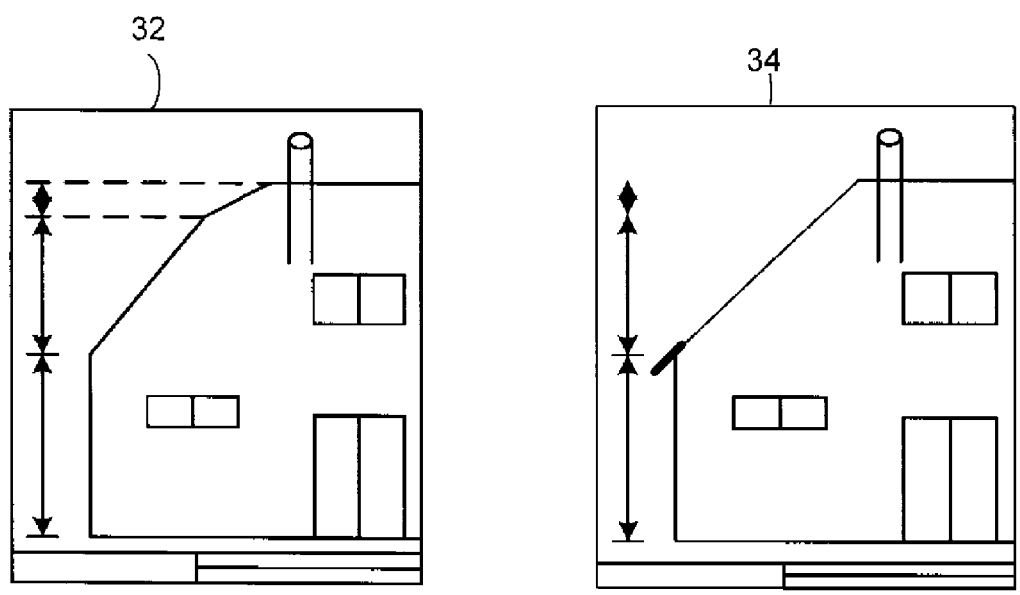
FIG. 11 shows the modified document and the original document after the application of a scale normalizing transform function.

The step of transforming the bitmap includes applying an inverse transform matrix function to the bitmap 48, with the offset angle 74 being the parameter to such function. According to one aspect of the present invention, the inverse transform matrix function rotates the bitmap 48 to be in alignment with the common reference 72 as shown in FIG. 9. The amount of rotation is determined by the offset angle 74. In another aspect, the inverse transform matrix function is a scaling function. As shown in the example of FIG. 10, prior to the transformation, the modified document 32 may be substantially smaller than the original document 34. Upon performing the scaling transformation as shown in FIG. 11, the size of the modified document 32 and the size of the original document 34 are normalized. It is further contemplated that skewing and offset inverse transform matrix functions may be utilized in lieu of or in addition to the scaling and rotation inverse transform matrix functions. In one embodiment of the present invention, the foregoing inverse transform matrix functions are predefined. More particularly, the functionality may be provided in standard libraries such as the Microsoft .NET Matrix object. It is understood that any standard library capable of implementing the foregoing inverse transform matrix functions may be readily substituted without departing from the scope of the present invention.

As indicated above, the method in accordance with one aspect of the present invention is used in conjunction with methods for emphasizing differences between the modified document 32 and the original document 34. Accordingly, any objects placed thereon to emphasize differences must have the appropriate offset angle 74 applied thereto. In this regard, according to another aspect of the present invention, the offset angle 74 is stored in memory per step 205 for later retrieval.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show any more detail than is necessary for the fundamental understanding of the present invention, the description taken with the drawings making apparent to those skilled in the art how the several forms of the present invention may be embodied in practice.

What is claimed is:

1. A method for aligning a modified document and an original document for emphasizing differences, the method comprising:
    receiving a first bitmap representative of the modified document including a first anchor, and a second bitmap representative of the original document including a second anchor, the first and second bitmaps each being defined by a plurality of pixels arranged in ordered rows and columns from a left side to a right side, each of the pixels having pixel coordinates associated therewith;
    deriving a set of first vertex coordinates of the first anchor and a set of second vertex coordinates of the second anchor;
    transforming the first bitmap to a common reference based upon the first set of vertex coordinates; and
    transforming the second bitmap to the common reference based upon the second set of vertex coordinates;
    wherein deriving the set of first vertex coordinates further includes:
        storing in a first set of comprehensive coordinates lists the pixel coordinates of a leftmost pixel matching a trigger value and a rightmost pixel matching the trigger value in every row of the first bitmap;
        storing in a sample coordinates list a subset of the pixel coordinates in the first set of comprehensive coordinates lists; and
        assigning average pixel coordinates of the sample coordinates list to a one of the set of first vertex coordinates when attributes of the sample coordinates list satisfy a predefined condition.

2. The method of claim 1, wherein the attributes include the average pixel coordinates of the sample coordinates list and a standard deviation of the pixel coordinates in the sample coordinates list.

3. The method of claim 2, wherein the predefined condition is the average pixel coordinates of the sample coordinates list being within two standard deviations of the pixel coordinates in the first comprehensive coordinates list.

4. The method of claim 2, wherein the predefined condition is the standard deviation of pixel coordinates in the sample coordinates list is sufficiently small.

5. The method of claim 1, wherein the sample coordinates list includes at least twenty pixel coordinates.

6. The method of claim 1, wherein the triggering value is a non-white pixel value.

7. A method for aligning a modified document and an original document for emphasizing differences, the method comprising:
    receiving a first bitmap representative of the modified document including a first anchor, and a second bitmap representative of the original document including a second anchor, the first and second bitmaps each being defined by a plurality of pixels arranged in ordered rows and columns from a left side to a right side, each of the pixels having pixel coordinates associated therewith;
    deriving a set of first vertex coordinates of the first anchor and a set of second vertex coordinates of the second anchor;
    transforming the first bitmap to a common reference based upon the first set of vertex coordinates; and
    transforming the second bitmap to the common reference based upon the second set of vertex coordinates;
    wherein deriving the set of second vertex coordinates further includes:
        storing in a second set of comprehensive coordinates lists the pixel coordinates of a leftmost pixel matching a trigger value and a rightmost pixel matching the trigger value in every row of the second bitmap;
        storing in a sample coordinates list a subset of the pixel coordinates in the second set of comprehensive coordinates lists; and
        assigning average pixel coordinates of the sample coordinates list to a one of the set of second vertex coordinates when attributes of the sample coordinates list satisfy a predefined condition.

8. The method of claim 7, wherein the attributes include the average pixel coordinates of the sample coordinates list and a standard deviation of the pixel coordinates in the sample coordinates list.

9. The method of claim 8, wherein the predefined condition is the average pixel coordinates of the sample coordinates list being within two standard deviations of the pixel coordinates in the second comprehensive coordinates list.

10. The method of claim 8, wherein the predefined condition is the standard deviation of pixel coordinates in the sample coordinates list is sufficiently small.

11. The method of claim 7, wherein the sample coordinates list includes at least twenty pixel coordinates.

12. The method of claim 7, wherein the triggering value is a non-white pixel value.

* * * * *